May 5, 1925.
A. E. EVANS
1,536,832
FLUID COOLED ROLL
Filed May 13, 1924
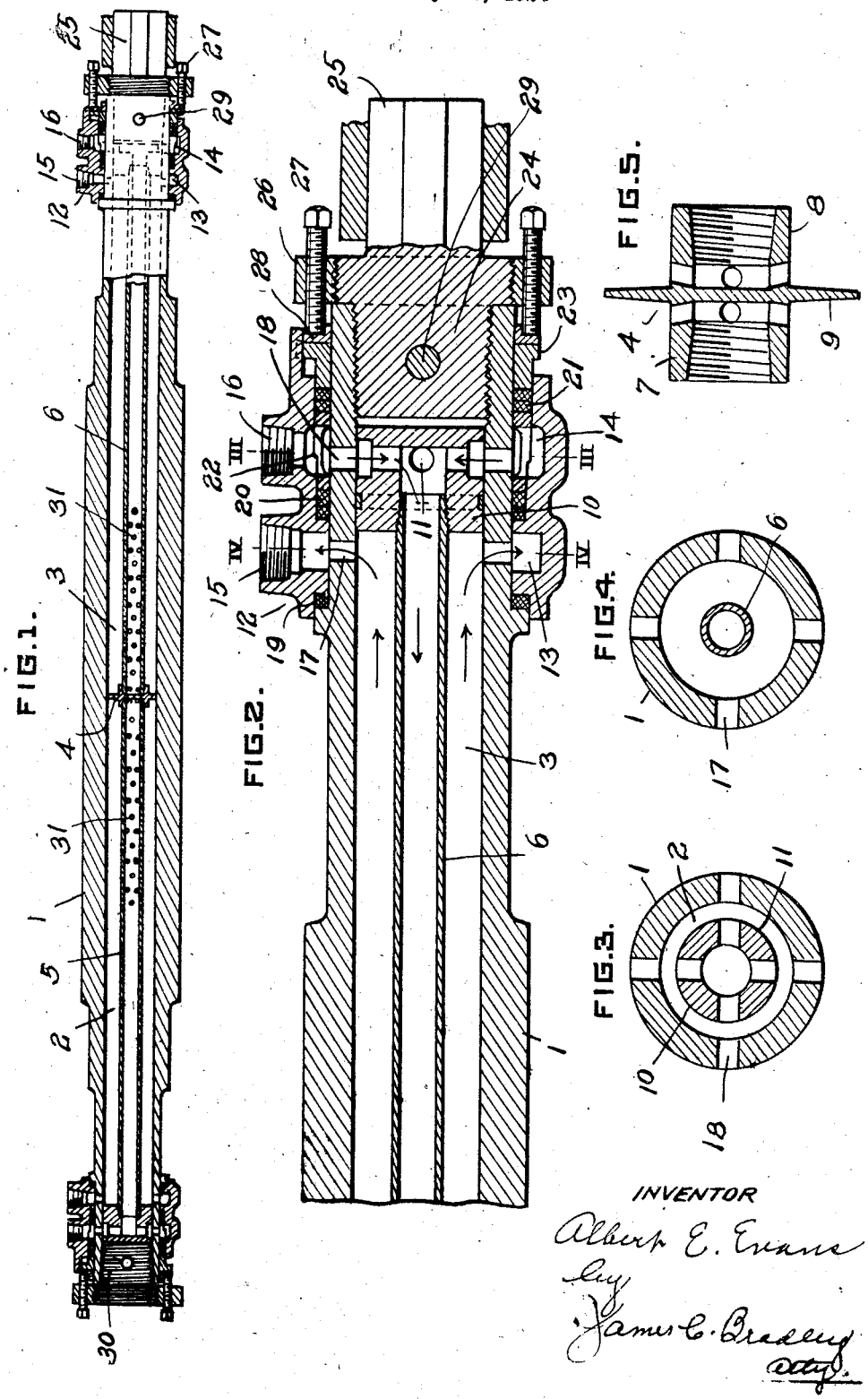
INVENTOR
Albert E. Evans
by
James C. Bradley
atty.

Patented May 5, 1925.

1,536,832

UNITED STATES PATENT OFFICE.

ALBERT E. EVANS, OF PITTSBURGH, PENNSYLVANIA, ASSIGNOR TO PITTSBURGH PLATE GLASS COMPANY, A CORPORATION OF PENNSYLVANIA.

FLUID-COOLED ROLL.

Application filed May 13, 1924. Serial No. 713,108.

*To all whom it may concern:*

Be it known that I, ALBERT E. EVANS, a citizen of the United States, and a resident of Pittsburgh, in the county of Allegheny and State of Pennsylvania, have made a new and useful invention in Improvements in a Fluid-Cooled Roll, of which the following is a specification.

The invention relates to fluid cooled rolls, and is designed particularly for use in apparatus for continuously rolling a glass sheet, such as that illustrated and described in the application of Frederick Gelstharp, Serial Number 656,441, although the roll construction is not limited to use in this particular relation. In apparatus for rolling glass, in which fluid cooled rolls are employed, it is desirable that the rolls should be cooled uniformly, as otherwise they will soon be warped out of shape so that it is impossible to produce a sheet of uniform thickness and furthermore, the application of a nonuniform cooling effect on the glass sheet or ribbon being formed introduces strain into the sheet, increasing breakage. One object of the present invention is the provision of improved means for securing a uniform cooling effect throughout the length of the roll. Other objects of the invention are the provision of rolls which may be made without difficulty, which are of simple construction. One embodiment of the invention is illustrated in the accompanying drawings, wherein:

Figure 1 is a longitudinal section through the roll. Fig. 2 is a section through one end of the roll on a larger scale than Fig. 1. Figs. 3 and 4 are sections through the roll (not including the swivel) on the lines III—III and IV—IV of Fig. 2. And Fig. 5 is an enlarged longitudinal section through the coupling member used at the center of the roll.

The body of the roll consists of a cylindrical casing 1, preferably of cast iron or steel. The interior of the roll is divided into two chambers 2 and 3 by means of a partition member 4 which also acts as a coupling for the inlet pipes 5 and 6. The member 4 is provided with sleeve portions 7 and 8 (Fig. 5) into which the ends of the pipes are screwed, while the partition plate 9 has an accurate fit with the bore of the cylinder. At their outer ends, the pipe sections are threaded into piston members 10, 10, which as indicated in Figs. 2 and 3 are provided with perforations 11 for admitting fluid to the pipes from the swivels 12, 12.

These swivels are each provided with the annular passages 13 and 14 leading to the screw sockets 15 and 16, to which suitable piping is attached. The annular passages communicate with the pipes 5 and 6 and with the chambers 2 and 3 surrounding the pipes by means of the series of perforations 17 and 18 extending through the walls of the casing 1. The swivels are made tight by means of the packing rings 19, 20 and 21, a skeleton cage 22 being interposed between the packing rings 20 and 21, so that the pressure imposed upon the packing rings 21 by the follower member 23 is transmitted to the packing rings 20. Screwed into the right hand end of the roll is the block 24 having the squared end 25 by means of which the roll is turned. This block is provided with a flange upon which is screwed the ring 26 and this ring carries a plurality of bolts 27 engaging a ring 28 which in turn engages the follower member 23, thus providing a means for tightening the packing. The block 24 is prevented from unscrewing by means of a transverse pin 29 which extends through the block and through the walls of the casing. At the other end of the roll, a similar block is employed at 30, such block, however, lacking the turning means 25 of the block 24 as the roll is turned from one end only.

Each of the pipes 5 and 6 is provided with a series of perforations 31, and when water is supplied to the outer end of the pipes through the connections 16, this water flows in through the pipes and discharges through the perforations 31 to the chambers 2 and 3 through which it flows back to the outer ends of the roll and discharges through the perforations 17 leading to the outlet pipes which are connected at 15. The arrangement and size of the perforations will depend upon conditions, the arrangement being preferably such that a uniform cooling effect will be secured throughout the length of the roll. This distribution may be influenced by the size of the perforations, and their spacing and it is undesirable that the discharge at any one point along the pipe should be such as to give a cold spot on the roll. Due to the fact that the roll is heated by the glass to a greater extent at the center than at the ends, it is necessary or desirable that the coolest water of the circulating body should be supplied at the center of the roll, and for this reason, the circulation is arranged as illustrated with the inlets through the pipes so that they discharge at their inner ends, thus giving liquid of a lower temperature near the center of the rolls than at the ends, since the liquid is raised in temperature from the roll by the time it reaches the outer end of the roll. The division of the roll into two chambers by means of the partition member 4 also insures that the cooling effect secured by the liquid upon the two halves of the roll shall be substantially the same. Other advantages incident to the simplicity of the structure will be readily apparent to those skilled in the art.

What I claim is:

1. In combination in a roll, an outer cylindrical casing, a pipe extending longitudinally through the casing spaced away from the inner wall thereof to provide an annular chamber, partition means intermediate the ends of the roll dividing said chamber and the passage through the pipe each into two sections, communications between the inner end of each of said sections of pipe and the section of the chamber surrounding it, and means for providing a circulation of cooling fluid through each pipe section and the section of the chamber surrounding it.

2. In combination, a hollow roll divided adjacent its center into two chambers, and means for circulating a cooling fluid into the chambers from the ends of the roll to points adjacent the inner ends of said chambers and then back to the outer ends thereof.

3. In combination, a hollow roll divided adjacent its center into two chambers, and means for circulating a cooling fluid into the chambers from the ends of the roll to points adjacent the inner ends of said chambers and then back to the outer ends thereof, the said means including conduits or pipes placed concentrically of said chambers and opening into said chambers at their inner ends.

4. In combination, a hollow roll divided adjacent its center into two chambers, and means for circulating a cooling fluid into the chambers from the ends of the roll to points adjacent the inner ends of said chambers and then back to the outer ends thereof, the said means including conduits or pipes placed concentrically of said chambers and opening into said chambers at their inner ends, and constituting the inlets, by means of which, the cooling fluid is discharged to the annular spaces surrounding the pipes which act as outlets.

5. In combination in a roll, an outer cylindrical casing, a pipe extending longitudinally through the casing spaced away from the inner wall thereof to provide an annular chamber, partition means intermediate the ends of the roll dividing said chamber and the passage through the pipe each into two sections, communications between the inner end of each of said sections of pipe and the section of the chamber surrounding it, and means for providing a circulation of cooling fluid through each pipe section and the section of the chamber surrounding it, the pipe sections constituting the inlets and the chamber sections the outlets.

6. In combination in a roll, an outer cylindrical casing, a coupling member at the center of the roll formed so as to constitute a partition dividing the roll into two chambers, a perforated pipe extending into the roll from each end thereof and engaging said coupling, and means for circulating cooling fluid through the pipes from their outer ends and discharging such fluid from the outer ends of the chambers surrounding the pipes.

7. In combination in a roll, an outer cylindrical casing, a coupling member at the center of the roll formed so as to constitute a partition dividing the roll into two chambers, a pipe extending into the roll from each end thereof and engaging said coupling and each having its inner portion provided with a series of perforations, and means for circulating cooling fluid through the pipes from their outer ends and discharging such fluid from the outer ends of the chambers surrounding the pipes.

In testimony whereof, I have hereunto subscribed my name this 21st day of April, 1924.

ALBERT E. EVANS.